United States Patent

[11] 3,565,396

[72] Inventor Richard S. Spear
 Anaheim, Calif.
[21] Appl. No. 813,158
[22] Filed Apr. 3, 1969
[45] Patented Feb. 23, 1971
[73] Assignee B-A-L Products Corporation
 Denver, Colo.

[54] TRAILER JACK
 7 Claims, 5 Drawing Figs.
[52] U.S. Cl. .................................................. 254/86
[51] Int. Cl. ................................................. B60s 9/02
[50] Field of Search ...................................... 254/86;
 280/150.5

[56] References Cited
 UNITED STATES PATENTS
 3,345,038 10/1967 Taylor ........................ 254/86

Primary Examiner—Andrew R. Juhasz
Assistant Examiner—David R. Melton
Attorney—Fulwider, Patton, Rieber, Lee & Utecht ABSTRACT: A trailer jack for securement to the underside of a trailer. The jack includes a frame formed with a longitudinal track having inwardly turned flanges on its lower side which terminate in opposed extremities defining a leg-receiving passage. A longitudinal screw is rotatably mounted in the frame and drives a trunnion in such track, such trunnion supporting the upper end of a support leg which extends downwardly through the passage. A connecting link is pivotally connected on its upper end with the frame and has its lower end pivotally connected to the leg whereby the screw may be rotated to drive the trunnion along the track and lower the leg to its supporting position and said opposed flanges will retain the trunnion to restrain the screw against bending as the leg is loaded.

PATENTED FEB 23 1971

3,565,396

INVENTOR.
RICHARD S. SPEARS
BY Fulwider, Patton, Rieber
Lee and Utecht
ATTORNEYS

TRAILER JACK

BACKGROUND OF THE INVENTION

1. Field of the Invention

The invention relates to jacks which may be mounted under the corners of house trailers and may be raised while the trailer is being transported and may be lowered to provide support at such corners when the trailer is parked.

2. Description of the Prior Art

Trailer jacks have been proposed which include support legs having their upper ends coupled with an elongated screw whereby the legs may be lowered to their supporting position by rotation of the screw. A jack of this type is shown in U.S. Pat. No. 3,345,038. Trailer jacks of this design suffer the shortcoming of having the screw supported only on its opposite ends whereby the compressive loads on such screw during lowering of the leg causes the screw to bend or buckle thus creating a high resistance to rotation.

SUMMARY OF THE INVENTION

The present invention is characterized by a trailer jack having a frame which forms an elongated track having inwardly projecting flanges on its lower side which terminate in opposed edges that cooperate to define a leg-receiving passage. A longitudinal screw is rotatably supported from the frame and drives a trunnion supported in the track. A support leg has its upper end pivotally connected to the trunnion and a link is pivotally connected on one end to the frame and on its opposite end to the support leg whereby rotation of the screw will slide the trunnion in the track and lower the support leg, the trunnion being supported against downward movement by said flanges whereby said screw is restrained from bending.

The objects and advantages of the present invention will become apparent from a consideration of the following detailed description when taken in conjunction with the accompanying drawing.

DESCRIPTION OF THE PREFERRED EMBODIMENT

Figure 1:
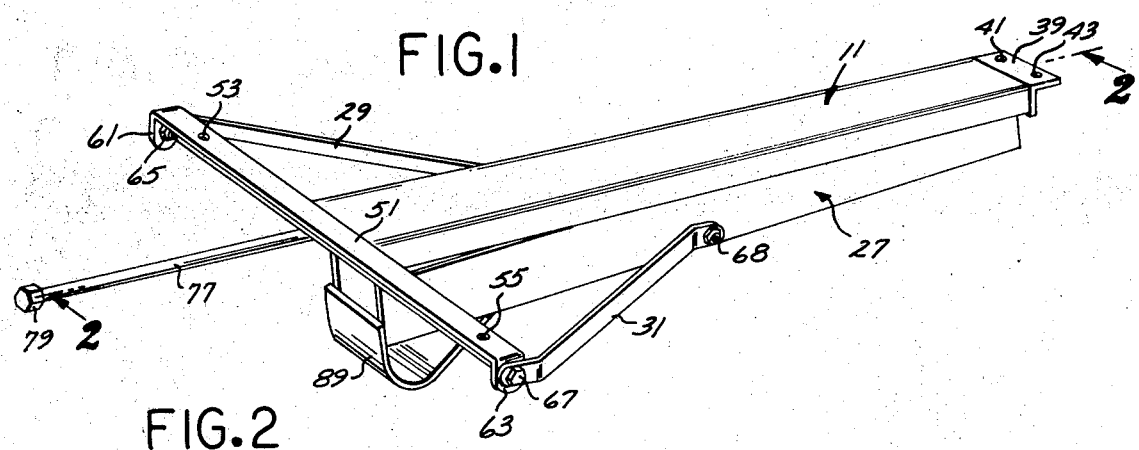
FIG. 1 is a perspective view of a trailer jack embodying the present invention.

The trailer jack of present invention is particularly adapted to be mounted to the underside of a house trailer 10 and includes a channel-type frame, generally designated 11, formed with a longitudinal passage 15 having inwardly turned flanges 17 and 19 on its bottom side. A trunnion, generally designated 21, is carried in the track 15 and is in threaded engagement with a longitudinal screw 25 which is rotatably supported on its opposite ends from the frame 11. The upper end of a support leg, generally designated 27, is supported by the trunnion 21 and a pair of links 29 and 31 pivotally connects the midportion of such leg to one end of the frame 11. Thus, the screw 25 may be rotated to drive the trunnion 21 to the left, as viewed in FIG. 3, to lower the leg 27 to its supporting position and said trunnion will be supported against downward movement by means of the flanges 17 and 19 thereby preventing buckling of the screw 25 as the leg 27 is weighted.

The frame 11 is formed by a downwardly facing C-channel having sidewalls 28 and 29 which turn inwardly on their lower extremities to form the flanges 17 and 19. The flanges 17 and 19 terminate in respective opposed edges 31 and 33 which define a passage 35 for extension of the downwardly projecting leg 27.

The inner end of the frame 11 is covered by an angle 39 having a pair of bores 41 and 43 therein for receipt of mounting bolts 45 which secure such angle to the underside of a house trailer 47. The inner end of the screw 25 is formed with a reduced-in-diameter bearing portion 48 which is journaled through a bore 49 in the downwardly projecting flange of the angle 39, and receives washers 50 and 51 which assist in retaining the screw 25 against axial shifting. The outer end of the frame 11 is covered by a transversely extending angle 51 having a pair of mounting bores 53 and 55 therein for receipt of mounting bolts 57. The outer end of the screw 25 is journaled through a bore 58 in the downwardly projecting flange of the angle 51 and is formed with a shoulder 59 for abutting such flange to retain such screw against axial shifting. The opposite extremities of the transversely projecting angle 51 are bent downwardly to form ears 61 and 63 for receipt of pivot pins 65 and 67 which secure the upper extremities of the links 29 and 31 to the frame 11. The lower extremities of such links are pivotally connected with the intermediate portion of the leg 27 by means of bolts 68.

It is noted that the screw 25 includes a relatively long portion 77 which projects outwardly beyond the angle 51 and nearly to the side of the trailer 10 where a hexagon head 79 is formed for receipt of a conventional wrench utilized to lower the jack. Thus, the jack may be mounted some distance under the trailer 47 but will be conveniently accessible from the side thereof.

Figure 5:
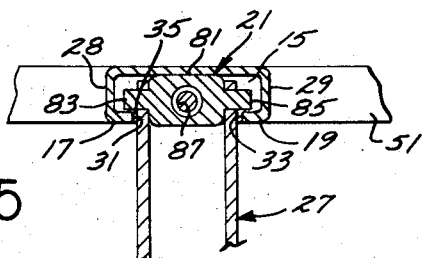
FIG. 5 is a vertical sectional view taken along the line 5-5 of FIG. 3.

Referring to FIG. 5, the trunnion 21 is formed with a transversely extending cylindrical central portion 81 having oppositely projecting axial ears 83 and 85 which ride on the respective inwardly turned flanges 17 and 19. The trunnion includes a through bore 87 which is internally threaded for receiving the externally threaded screw 25.

The support leg 27 is in the form of a channel which closely fits the passage 35 formed between the edges 31 and 33 of the flanges 17 and 19. The lower end of the leg 27 has an arcuate strip of metal welded thereto for forming a foot 89.

Figure 2:
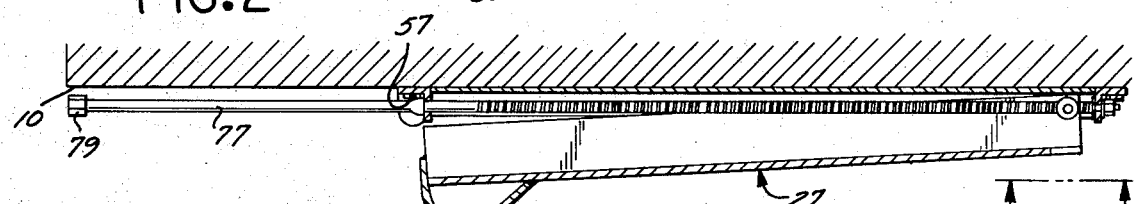
FIG. 2 is a vertical sectional view taken along the line 2-2 of FIG. 1.
Figure 3:
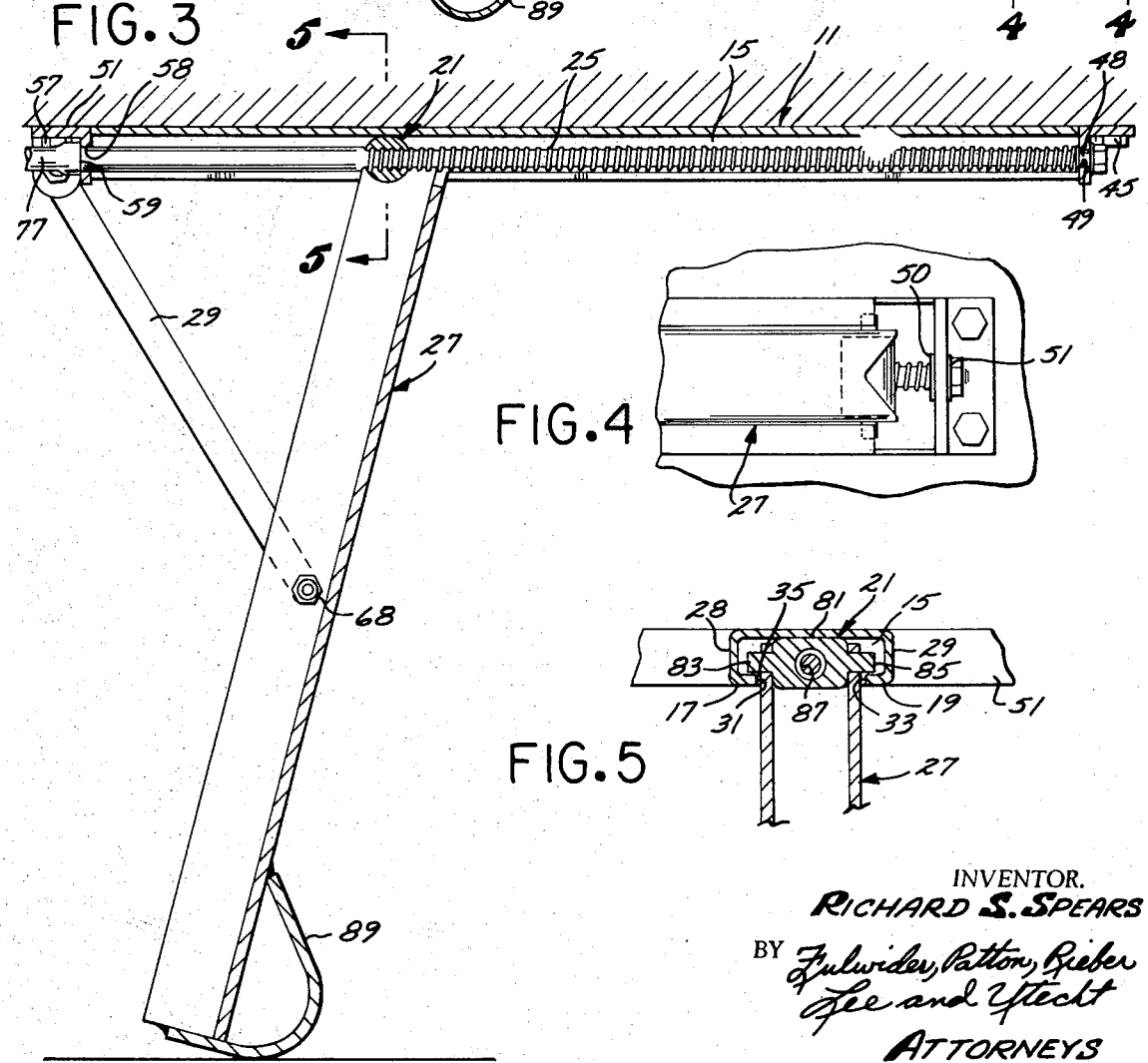
FIG. 3 is a vertical sectional view, in enlarged scale, similar to FIG. 2 and showing the jack in its supporting position.
Figure 4:
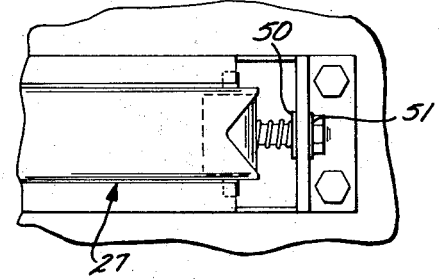
FIG. 4 is a partial bottom plan view taken along the line 4-4 of FIG. 2.

In operation, the frame 11 is bolted to the underside of the trailer 10 by means of the mounting bolts 45 and 57. Obviously, the mounting angles 51 and 39 may be replaced by flat pads or any other convenient mounting means. A tire wrench may then be engaged with the hexagon head 79 of the screw 25 and such screw rotated to drive the trunnion 21 to the right as shown in FIG. 3, thereby raising the leg 27 to its elevated position shown in FIG. 2 for convenient transportation of the trailer 10. When the trailer 10 is to be parked, the screw 25 may be rotated to drive the trunnion 21 to the left thus swinging the support leg downwardly to the supporting position shown in FIG. 3 to thereby provide support for the trailer 10. It will be noted that as the screw 25 is rotated to move the trunnion 21 to the left the washer 50 (FIG. 4) will limit axial movement to the right of such screw and, if the trunnion 21 were not retained in the track 15 by the flanges 17 and 19, the resultant compressive forces on such screw would tend to buckle it downwardly thus causing the trunnion to bind on the screw 25 and presenting a high resistance to turning of the screw. This buckling tendency is compounded by the fact that lowering of the leg 27 creates a moment about the bolts 68 connecting the links 29 and 31 thereto thus effecting a downward force on the intermediate portion of the screw 25. However, the flanges 17 and 19 support the screw 25 thus avoiding the consequent binding and resistance to turning. It is also of particular importance that the downwardly extending sidewalls 28 and 29 of the frame 11 provide support against bending of such frame when compressive loads are applied thereto by the force of the screw 25 acting on the downwardly projecting flange of the angle 51 as the trunnion is driven to the left (FIG. 3).

From the foregoing it will be clear that the trailer jack of present invention is economical to manufacture and sturdy in construction. Such jack is convenient to operate and overcomes the resistance to turning of the drive screw which is attendant with prior art jacks during actuation thereof.

Various modifications and changes may be made with regard to the foregoing detailed description without departing from the spirit of the invention.

I claim:

1. A trailer jack for securement to the underside of a trailer, comprising:
   a frame including mounting means and formed with a longitudinal track having inwardly turned flanges on its lower side which terminate in opposed extremities defining a leg-receiving passage;
   a longitudinal screw rotatably mounted from said frame and restrained against longitudinal movement;
   a trunnion carried in said track and formed with a threaded portion for engaging said screw;
   a support leg carried on its upper end from said trunnion and projecting downwardly through said passage;
   a link pivotally connected on one end to said frame and on its opposite end to said leg; and
   whereby said frame may be mounted to the underside of said trailer and said screw rotated to drive said trunnion along said track to lower said leg while said trunnion is held captive in said track to restrain said screw against bending.

2. A trailer jack as set forth in claim 1 wherein said track is formed by a downwardly opening channel.

3. A trailer jack as set forth in claim 1 wherein said screw projects a selected distance beyond one end of said frame and is formed with a wrench-engaging head.

4. A trailer jack as set forth in claim 1 wherein:
   said link is disposed on one side of said frame; and
   said jack includes a second link disposed on the opposite side of said frame and pivotally connected on one end to said frame and on its opposite end to said leg.

5. A trailer jack as set forth in claim 2 wherein said screw projects a selected distance beyond one end of said frame and is formed with a wrench-engaging head.

6. A trailer jack as set forth in claim 2 wherein:
   said link is disposed on one side of said frame; and
   said jack includes a second link disposed on the opposite side of said frame and pivotally connected to one end to said frame and on its opposite end to said leg.

7. A trailer jack as set forth in claim 4 wherein: said mounting means includes a transverse bar affixed to one end of said frame and formed with oppositely projecting overhang portions, said opposite ends of said links being connected to said overhang portions.